United States Patent [19]
Genzel et al.

[11] Patent Number: 5,206,461
[45] Date of Patent: Apr. 27, 1993

[54] ARRANGEMENT FOR CONNECTING BUS BARS

[75] Inventors: Rolf-Günter Genzel, Lützelbach/ODW; Karl-Josef Zeimetz, Plein, both of Fed. Rep. of Germany

[73] Assignee: Siemens Aktiengesellschaft, Berlin and Munich, Fed. Rep. of Germany

[21] Appl. No.: 746,423

[22] Filed: Aug. 16, 1991

[30] Foreign Application Priority Data

Aug. 24, 1990 [DE] Fed. Rep. of Germany ....... 4027214

[51] Int. Cl.$^5$ .......................................... H01R 11/00
[52] U.S. Cl. ............................... 174/88 B; 174/68.2; 174/70 B; 174/99 B; 439/115; 439/210
[58] Field of Search ............... 174/88 B, 68.2, 99 B, 174/70 B, 71 B, 72 B; 439/115, 210, 212, 213

[56] References Cited

U.S. PATENT DOCUMENTS

| | | | |
|---|---|---|---|
| 2,097,324 | 10/1937 | Hill | 174/88 B X |
| 2,310,919 | 2/1943 | Adam | 174/99 B |
| 2,932,686 | 4/1960 | Herrmann | 439/213 X |
| 3,509,514 | 4/1970 | Christensen et al. | 174/72 B |
| 4,842,533 | 6/1989 | Beberman et al. | 174/88 B X |

FOREIGN PATENT DOCUMENTS

| | | |
|---|---|---|
| 0108868 | 5/1984 | European Pat. Off. |
| 0909717 | 4/1954 | Fed. Rep. of Germany |
| 7031014 | 12/1970 | Fed. Rep. of Germany |
| 2415009 | 10/1975 | Fed. Rep. of Germany |
| 7834514 | 2/1979 | Fed. Rep. of Germany |
| 2853585 | 6/1980 | Fed. Rep. of Germany .... 174/88 B |
| 8009461 | 7/1980 | Fed. Rep. of Germany |
| 8138227 | 6/1982 | Fed. Rep. of Germany |
| 8808131 | 10/1988 | Fed. Rep. of Germany |
| 3742206 | 6/1989 | Fed. Rep. of Germany |
| 8912151 | 6/1990 | Fed. Rep. of Germany |
| 113887 | 9/1979 | Japan ................................. 439/212 |

Primary Examiner—Morris H. Nimmo
Attorney, Agent, or Firm—Kenyon & Kenyon

[57] ABSTRACT

An arrangement for connecting aligned sections of a bus bar includes connecting pieces of approximately rectangular basic shape. Crown-rounded contact surfaces are provided at the ends of the connecting pieces to rest on the narrow sides of the rectangular profile of the bus bars. Two contact surfaces flanked by elevations are provided on one of the sides of the connecting piece, while two pairs of contact surfaces are provided on the opposite side. To connect the sections of single bus bars, the connecting pieces are used in such a manner that the sections are flanked by the elevations, while to connect double bus bars the reversed position is provided, in which elevations between the pairs of contact surfaces are situated between the parallel sections of the bus bar set.

19 Claims, 3 Drawing Sheets

ARRANGEMENT FOR CONNECTING BUS BARS

BACKGROUND OF THE INVENTION

The invention relates generally to arrangements for connecting aligned sections of bus bars, and more specifically to such an arrangement using two strap-type connecting pieces gripping over the mutually opposite ends of the sections and a clamping screw.

Known arrangements of this type are produced using profile parts made of the material of the bus bars. In this case, at least two clamping screws extend through bores in the bus bars and the connecting pieces, which rest on the broad sides of the sections of the bus bars.

The present invention is directed to the problem of developing an arrangement for connecting bus bars which makes individual bores in those sections of the bus bars which are to be connected unnecessary and reduces the number of clamping screws.

SUMMARY OF THE INVENTION

The present invention solves this problem by providing that each connecting piece have crown-rounded contact surfaces at its ends, which are provided to rest on the sections of the bus bars Two contact surfaces are disposed in mutually opposite configurations on a first side of each connecting piece and two elevated sections are disposed on either side of these contact surfaces. Two pairs of contact surfaces are disposed in mutually opposite configuration on the second, opposite side of each connecting piece, with an elevated section being situated between the contact surfaces of each pair.

An essential property of the novel connecting pieces consists in that they are suitable both for single bus bar sets and also for double bus bars, which are disposed in parallel at a spacing from one another. Where single bus bars are to be connected, the connecting pieces are fitted on to the sections of the bus bars in such a manner that these are flanked by the elevations on both sides of the contact surfaces This leads to the avoidance of a lateral displacement of the connecting pieces relative to the bus bars. Where, on the other hand, the intention is to connect the parallel sections of a double bus bar, the connecting pieces are fitted on to the bus bars in reversed position, that is in such a manner that the central elevations engage between the sections It is advisable to dimension the width of the central elevations in accordance with the spacing between the parallel sections of the double bus bar. In both cases, the clamping screw extends through the intermediate space between the opposing ends of the sections of the bus bars. This spacing does not need to be maintained precisely, since—according to the length of the connecting pieces—the sections are connected in the manner of a bridge. Likewise, the bores in the ends of the sections to be connected are unnecessary.

A single clamping screw is sufficient for the reliable mechanical and electrical connection of those sections of the bus bars which are to be connected. It is advisable to provide in the connecting pieces a central passage opening for this single clamping screw. This guarantees a uniform application of force.

A further advantage which arises by the resting of the connecting pieces on the narrow sides of the rectangular profile of the bus bars and by the use of only one clamping screw consists in that the screw head and the nut respectively are accessible at the upper or lower surface of the bus bar set and thus, even in the case of a plurality of parallel bus bar sets, the clamping screws are always accessible and can easily be monitored.

For the purpose of achieving an electrical and mechanical connection of the sections of the bus bars which is reliable over a long period of time, a further contribution can be made in that the connecting pieces are designed to be resiliently flexible under the influence of the clamping force. This property, which can be achieved by an appropriate selection of the material and of the material cross-section, causes, upon tightening the clamping screw, a slight rolling motion of the crowned contact surfaces on the sections of the bus bar. This improves the achievement of contact. It should further be stated that thermal expansions of the bus bars are possible without any damage to the connecting arrangement, because the clamping screw does not penetrate the bus bars.

DETAILED DESCRIPTION

Figure 1:
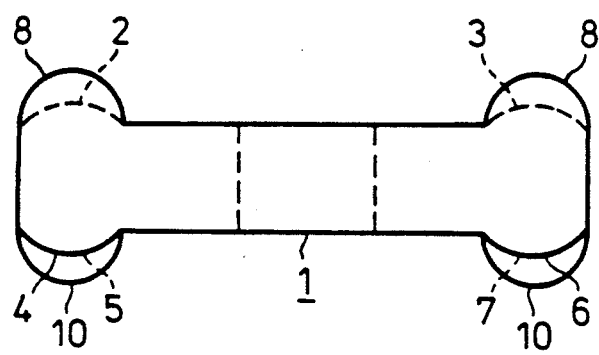
FIG. 1 shows a connecting piece for bus bars in a side view.
Figure 2:
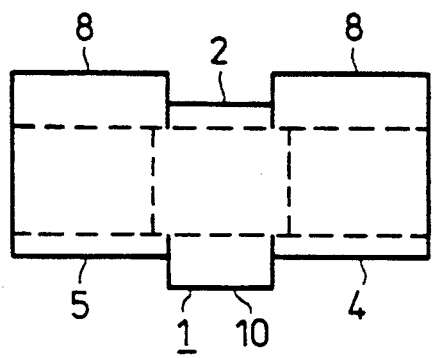
FIG. 2 shows a connecting piece for bus bars in a front view.
Figure 3:
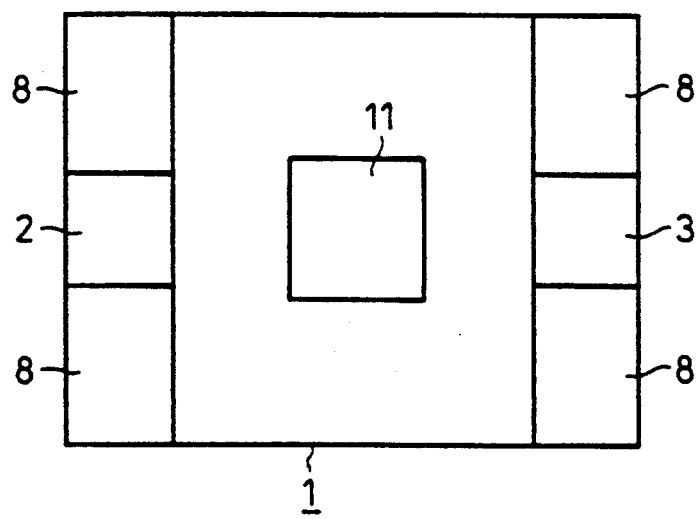
FIG. 3 shows a connecting piece for bus bars in a top plan view.

The connecting piece 1 according to FIGS. 1, 2 and 3, in the case of a rectangular basic shape (FIG. 3), have crown-rounded contact surfaces on both sides of the ends provided to rest on the bus bars. On one of the sides, there are the contact surfaces 2 and 3, on both sides of which two respective elevations 8 are disposed. Contact surfaces disposed in pairs are provided on the opposite side. Between the contact surfaces 4 and 5, as well as 6 and 7 of each one of these pairs there is situated an elevation 10, which is disposed centrally. The width of the elevations 10 corresponds to the intended spacing of the parallel sections of a double bus bar in accordance with FIGS. 6 and 7. In a central arrangement, i.e. at the point of intersection of the diagonals of the rectangular basic shape of the connecting piece 1, a passage opening 11 (FIG. 3) is provided for a clamping screw. The passage opening 11 has the shape of a square aperture, which offers the possibility of using a screw with a square attachment to the screw head. An entrainment of the screw upon tightening the nut can be avoided by this.

Figure 4:
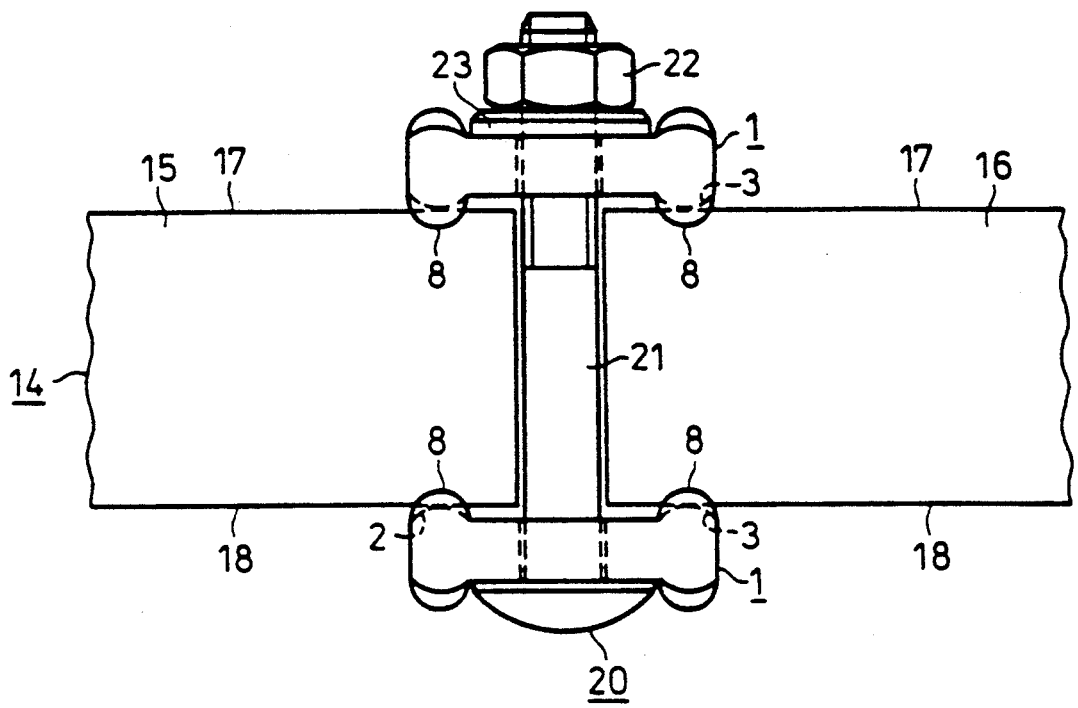
FIG. 4 shows the connection of sections of a single bus bar in a side elevation.
Figure 5:
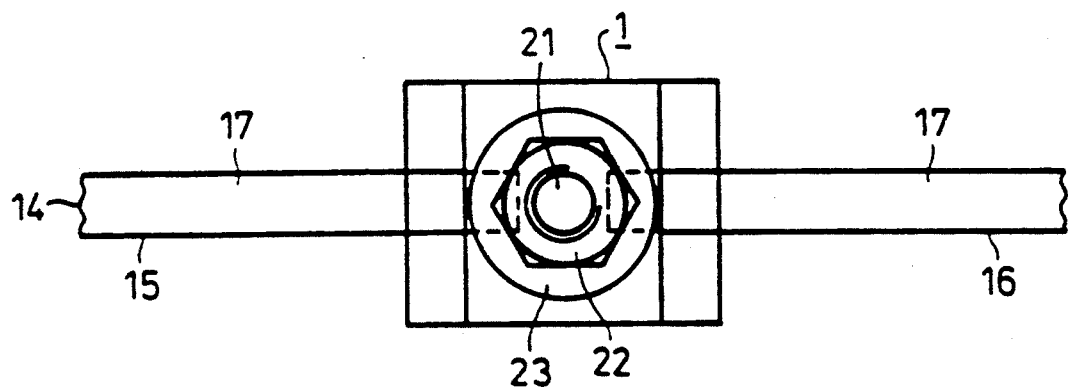
FIG. 5 shows the connection of sections of a single bus bar in a top plan view.

In the text which follows, an arrangement for electrically and mechanically connecting sections 15 and 16 of a single bus bar 14 is described in the first instance with reference to FIGS. 4 and 5. On the narrow sides 17 and 18 of the two sections 15 and 16 there rests a respective connecting piece 1 according to FIGS. 1, 2 and 3. The sections 15 and 16 rest between the elevations 8 and are aligned with respect to one another in this manner. Between the sections 15 and 16 there is a spacing, which at least corresponds to the diameter of the shaft 21 of the clamping screw 20. However, as shown by FIGS. 4 and 5, the spacing may be greater, in accordance with the length of the connecting pieces 1. In this manner, a considerable tolerance is permissible in the longitudinal direction of the bus bar 14, irrespective of whether this tolerance is caused by a dimensional deviation or by thermal expansions The contact and connecting force is applied using the clamping screw 20 by means of a nut 22 and a pressure plate 23. Where a plurality of bus bars are disposed side by side, the nuts 22 rest on the readily accessible upper surface of the bus bar set and are readily accessible in the course of assembly and for inspection.

Figure 6:
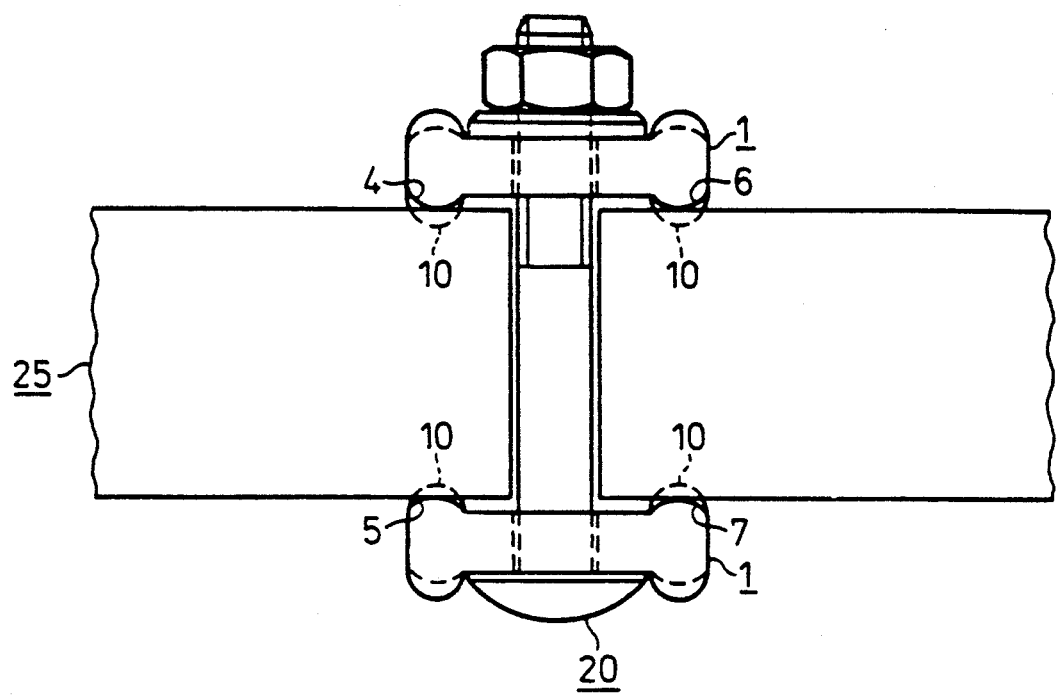
FIGS. 6 and 7 show corresponding representations for a double bus bar.
Figure 7:
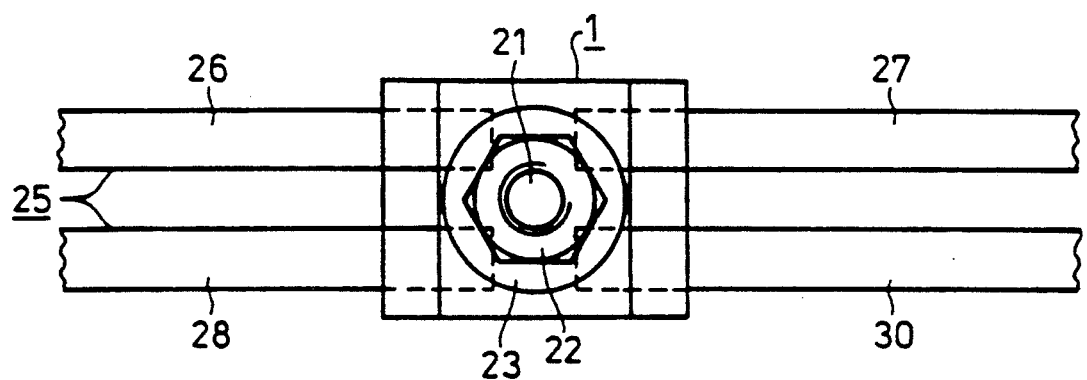

In the further example of a connection of bus bars according to FIGS. 6 and 7, a double bus bar 25 with sections 26 and 27 as well as 28 and 30 is likewise mechanically and electrically connected by means of two connecting pieces 1 The difference as compared with the example according to FIGS. 4 and 5 is merely that the connecting pieces 1 are disposed so as to be reversed, i.e., in such a manner that the elevations 10 engage between the parallel sections 26 and 28 and 27 and 30 respectively and as a result of this determine the lateral spacing of these sections and support them against laterally acting forces on account of the current flowing through the bus bars. In a similar manner to that already described, a clamping screw 20 with a nut 22 and a pressure plate 23 is provided.

As can readily be seen from the Figures, the described connecting pieces 1 can be used for bus bars of equal width, but of differing height of the rectangular profile. In the case of a greater or smaller width of the rectangular profile, it is advisable to use appropriately adapted connecting pieces.

What is claimed is:

1. An arrangement for connecting a first and second aligned section of a bus bar, comprising:
   a) a first connecting piece for gripping a first side of the first and second aligned sections, including:
      (i) a first end having:
         (A) a first pair of elevations; and
         (B) a first crown-rounded contact surface, said first crown-rounded contact surface adapted for resting on the first side of the first aligned section and being disposed between said first pair of elevations; and
      (ii) a second end having:
         (A) a second pair of elevations; and
         (B) a second crown-rounded contact surface, said second crown-rounded contact surface adapted for resting on the first side of the second aligned section and being disposed between said second pair of elevations; and
   b) a second connecting piece for gripping a second side of the first and second aligned sections, including:
      (i) a third end having:
         (A) a third pair of elevations; and
         (B) a third crown-rounded contact surface, said third crown-rounded contact surface adapted for resting on the second side of the first aligned section and being disposed between said second pair of elevations; and
      (ii) a fourth end having:
         (A) a fourth pair of elevations; and
         (B) a fourth crown-rounded contact surface, said fourth crown-rounded contact surface adapted for resting on the second side of the second aligned section and being disposed between said second pair of elevations; and
   c) a clamping screw for holding the first and second aligned sections between the first and second connecting pieces.

2. The arrangement according to claim 1, wherein:
   a) said first end further comprises a first pair of crown-rounded contact surfaces and a first elevation disposed therebetween, on a side opposite said first crown-rounded contact surface and said first pair of elevations;
   b) said second end further comprises a second pair of crown-rounded contact surfaces and a second elevation disposed therebetween, on a side opposite said second crown-rounded contact surface and said second pair of elevations;
   c) said third end further comprises a third pair of crown-rounded contact surfaces and a third elevation disposed therebetween, on a side opposite said third crown-rounded contact surface and said third pair of elevations; and
   d) said fourth end further comprises a fourth pair of crown-rounded contact surfaces and a fourth elevation disposed therebetween, on a side opposite said fourth crown-rounded contact surface and said fourth pair of elevations.

3. The arrangement according to claim 2, wherein said first, second, third and fourth elevations comprise a width corresponding to a spacing of parallel sections of a double bus bar.

4. The arrangement according to claim 1, wherein said first and second connecting pieces further comprise a central passage for said clamping screw.

5. The arrangement according to claim 2, wherein said first and second connecting pieces further comprise a central passage for said clamping screw.

6. The arrangement according to claim 3, wherein said first and second connecting pieces further comprise a central passage for said clamping screw.

7. The arrangement according to claim 1, wherein said first and second connecting pieces are resiliently flexible under an influence of a desired clamping force.

8. The arrangement according to claim 2, wherein said first and second connecting pieces are resiliently flexible under an influence of a desired clamping force.

9. The arrangement according to claim 3, wherein said first and second connecting pieces are resiliently flexible under an influence of a desired clamping force.

10. The arrangement according to claim 4, wherein said first and second connecting pieces are resiliently flexible under an influence of a desired clamping force.

11. The arrangement according to claim 5, wherein said first and second connecting pieces are resiliently flexible under an influence of a desired clamping force.

12. The arrangement according to claim 6, wherein said first and second connecting pieces are resiliently flexible under an influence of a desired clamping force.

13. A bus bar connector comprising:
   a) a central portion;
   b) two end portions;
   c) a first of said end portions including a first side and a second side opposite said first side;
      i) two elevated portions having a crown rounded first contact surface disposed therebetween on said first side;
      ii) a pair of crown rounded contact surfaces having an elevated portion disposed therebetween on said second side; and d) a second of said end portions including a side corresponding to said first side and a side corresponding to said second side;
  i) a crown rounded contact surface disposed between two elevated portions on said side corresponding to said first side;
  ii) a pair of crown rounded contact surfaces having an elevated portion disposed therebetween on said side corresponding to said second side.

14. The connector of claim 13 wherein said central portion includes an aperture for receiving a damping screw.

15. The connector of claim 13 wherein the elevated portions on the second side and the side corresponding to the second side have a width corresponding to the spacing of parallel sections of a double bus bar.

16. The arrangement according to claim 2 wherein said first and second connecting pieces may be rearranged for connecting a double bus bar.

17. An arrangement for connecting first and second sections of a double bus bar, comprising:
  a) a first connecting piece, said first connecting piece having
    i) a first side, said first side having an inner surface including a first crown-rounded contact surface for contacting a first narrow side of one of said first sections of said double bus bar, a second crown-rounded contact surface for contacting a first narrow side of a second of said first sections of said double bus bar, and a first elevation, said first elevation being disposed between said first and second crown-rounded contact surfaces and adapted for providing a spacing between said first sections of said double bus bar, and
    ii) a second side, said second side having an inner surface including a third crown-rounded contact surface for contacting a first narrow side of one of said second sections of said double bus bar, a fourth crown-rounded contact surface for contacting a first narrow side of a second of said second sections of said double bus bar, and a second elevation, said second elevation being disposed between said third and fourth crown-rounded contact surfaces and adapted for providing a spacing between said second sections of said double bus bar;
  b) a second connecting piece, said second connecting piece having
    i) a first side, said first side having an inner surface including a first crown-rounded contact surface for contacting a second narrow side of one of said first sections of said double bus bar, a second crown-rounded contact surface for contacting a second narrow side of a second of said first sections of said double bus bar, and a first elevation, said first elevation of said second connecting piece being disposed between said first and second crown-rounded contact surfaces of said second connecting piece and adapted for providing a spacing between said first sections of said double bus bar, and
    ii) a second side, said second side having an inner surface including a third crown-rounded contact surface for contacting a second narrow side of one of said second sections of said double bus bar, a fourth crown-rounded contact surface for contacting a second narrow side of a second of said second sections of said double bus bar, and a second elevation, said second elevation of said second connecting piece being disposed between said third and fourth crown-rounded contact surfaces of said second connecting piece and adapted for providing a spacing between said second sections of said double bus bar; and
  c) a screw, said screw for clamping said first and second sections of said double bus bar between said first and second connecting pieces.

18. The arrangement of claim 17, wherein:
  i) said first side of said first connecting piece further includes an outer surface, said outer surface of said first side including a first and a second elevation, and a crown-rounded surface disposed between said first and second elevations of said outer surface of said first side;
  ii) said second side of said first connecting piece further includes an outer surface, said outer surface of said second side including a third and a fourth elevation, and a second crown-rounded surface disposed between said third and fourth elevations of said outer surface of said second side;
  iii) said first side of said second connecting piece includes an outer surface, said outer surface of said first side of said second connecting piece including a first and second elevation, and a first crown-rounded surface disposed between said first and second elevations of said outer surface of said first side of said second connecting piece; and
  iv) said second side of said second connecting piece includes an outer surface, said outer surface of said second side including a third and a fourth elevation, and a second crown-rounded surface disposed between said third and fourth elevations of said outer surface of said second side of said second connecting piece.

19. The arrangement of claim 18 wherein said first and second connecting pieces may be rearranged for connecting a single bus bar.

* * * * *